(12) United States Patent
Cho et al.

(10) Patent No.: US 8,515,163 B2
(45) Date of Patent: *Aug. 20, 2013

(54) SYSTEM AND METHOD FOR IDENTIFYING AND CLASSIFYING COLOR REGIONS FROM A DIGITAL IMAGE

(75) Inventors: Seungyeon Cho, Rego Park, NY (US); William Bither, Southampton, MA (US)

(73) Assignee: Kofax, Inc., Irvine, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/544,830

(22) Filed: Jul. 9, 2012

(65) Prior Publication Data

US 2012/0275695 A1     Nov. 1, 2012

Related U.S. Application Data

(63) Continuation of application No. 12/102,419, filed on Apr. 14, 2008, now Pat. No. 8,244,031.

(60) Provisional application No. 60/911,595, filed on Apr. 13, 2007.

(51) Int. Cl.
*G06K 9/00*  (2006.01)

(52) U.S. Cl.
USPC ............................. 382/162; 382/173; 382/181

(58) Field of Classification Search
USPC ................. 382/100–101, 104–105, 112–113, 382/162–231
See application file for complete search history.

(56) References Cited

U.S. PATENT DOCUMENTS

| | | | |
|---|---|---|---|
| 5,546,474 A * | 8/1996 | Zuniga | 382/176 |
| 5,696,611 A * | 12/1997 | Nishimura et al. | 358/518 |
| 6,009,191 A | 12/1999 | Julier | |
| 6,011,595 A | 1/2000 | Henderson et al. | |
| 6,118,552 A | 9/2000 | Suzuki et al. | |
| 6,292,168 B1 | 9/2001 | Venable et al. | |
| 6,393,147 B2 | 5/2002 | Danneels et al. | |
| 6,424,742 B2 | 7/2002 | Yamamoto et al. | |
| 6,480,624 B1 | 11/2002 | Horie et al. | |
| 7,130,471 B2 | 10/2006 | Bossut et al. | |
| 7,177,049 B2 | 2/2007 | Karidi | |
| 7,426,293 B2 | 9/2008 | Chien et al. | |
| 8,244,031 B2 * | 8/2012 | Cho et al. | 382/162 |
| 2007/0035780 A1 | 2/2007 | Kanno | |
| 2007/0046957 A1 | 3/2007 | Jacobs et al. | |
| 2007/0065033 A1 | 3/2007 | Hernandez et al. | |
| 2008/0253647 A1 | 10/2008 | Cho et al. | |

OTHER PUBLICATIONS

Non-Final Office Action Summary from U.S. Appl. No. 12/102,419 dated Aug. 3, 2011.
Final Office Action Summary from U.S. Appl. No. 12/102,419 dated Jan. 3, 2012.
Notice of Allowance and Fee(s) Due from U.S. Appl. No. 12/102,419 dated Apr. 9, 2012.

* cited by examiner

*Primary Examiner* — Manav Seth
(74) *Attorney, Agent, or Firm* — Zilka-Kotab, PC

(57) ABSTRACT

A system and method of identifying and classifying regions of a digital image. The method includes an initial step of inputting an image as a color digital image. Subsequently, information that identifies color regions of the color digital image is obtained. Finally, color and non-color regions of the color digital image are classified based upon the identifying information.

19 Claims, 5 Drawing Sheets

SYSTEM AND METHOD FOR IDENTIFYING AND CLASSIFYING COLOR REGIONS FROM A DIGITAL IMAGE

This application is a continuation of U.S. patent application Ser. No. 12/102,419 filed on Apr. 14, 2008, and claims the benefit of U.S. Provisional Application Ser. No. 60/911,595 filed on Apr. 13, 2007, each of which is hereby incorporated by reference in its entirety.

CROSS REFERENCE TO RELATED APPLICATIONS

This application claims the benefit of U.S. Provisional Application Ser. No. 60/911,595 filed on Apr. 13, 2007, which is hereby incorporated by reference in its entirety.

FIELD OF THE INVENTION

The present invention relates generally to a system and method for identifying and classifying color regions from a digital image and more particularly to a system and method that automatically converts a digitized color document to black and white when no useful color elements are detected.

BACKGROUND OF THE INVENTION

Many documents contain black and white textual content as well as valuable color information, such as photos, logos, stamps and other color markings. Examples of such documents include invoices, medical records, insurance claims and the like. The traditional process involved in digitizing these documents is to scan them as black and white. While this process creates a highly compressed image and small file size, all color information is lost.

Alternatively, such documents are scanned as color resulting in a substantially larger file than the equivalent black and white version but retaining all color information. As will be appreciated, when documents contain just black and white or gray textual elements, the additional color information is not useful. In known systems that scan as color, a manual review process must be used to convert these digitized color images to black and white for storage and bandwidth optimizations.

With the foregoing problems and concerns in mind, it is the general object of the present invention to provide a system and method for identifying and classifying color regions. In particular, the present invention provides a system that automatically converts a digitized color document to black and white when no useful color elements are detected.

SUMMARY OF THE INVENTION

It is an object of the present invention to provide a system and method for identifying and classifying color regions from a digital image.

It is another object of the present invention to provide a system and method for identifying and classifying color regions from a digital image to optimize storage and bandwidth.

It is another object of the present invention to provide a system and method for detecting whether a digital image contains useful color elements.

It is another object of the present invention to provide a system and method for automatically converting a digitized color document to black and white when no useful color elements are found.

It is another object of the present invention to provide a system and method for generating an optimized, highly compressed multi-layer file containing a digitized image.

It is another object of the present invention to provide a system and method that facilitates automated document sorting, region of interest classification, targeting and other tasks requiring image feature differentiation.

It is another object of the present invention to provide a system and method for digitizing an image that ignores color noise from a scanner.

It is another object of the present invention to provide a system and method for digitizing an image that allows for fast document digitization and the identification of documents that are in need of manual review.

It is yet another object of the present invention to provide a system and method for digitizing an image in which information and data from a prior step can be utilized in subsequent steps to expedite and reduce costs associated with identifying and classifying regions from a digital image.

An embodiment of the present invention is a system and method of identifying and classifying regions of a digital image. The method includes an initial step of inputting an image as a color digital image. Subsequently, information that identifies color regions of the color digital image is obtained. Finally, color and non-color regions of the color digital image are classified based upon the identifying information.

These and other objectives of the present invention, and their preferred embodiments, shall become clear by consideration of the specification, claims and drawings taken as a whole.

DETAILED DESCRIPTION OF THE PREFERRED EMBODIMENT

Referring generally to FIGS. 1-5, an embodiment of the present invention relates to a method or system for analyzing a digital image. In particular, the present invention relates to analyzing and classifying a digital image that has been scanned and digitized as a color image. As will be appreciated, when such images are digitized, each of the resulting pixels has associated color information, such as hue, saturation and value ("HSV"), or hue, saturation and lightness ("HSL"). When images are scanned as color, however, they create a relatively large file compared to images scanned as black and white. In an effort to reduce file sizes for storage and bandwidth optimization, it is desirable to convert color digital images that do not contain any useful color information to black and white. In known systems, a manual review process must be employed to accomplish this conversion.

In contrast, the present invention provides a system and method of classifying a color digital image into multiple categories. These categories or elements include backgrounds, color photos, gray photos, and color markings. This information can be used to automatically convert a digitized color document to black and white when no useful color elements are detected. Moreover, the inventive system and method ignores color noise often introduced from scanner charge coupled devices and generates information can be used to generate an optimized, highly compressed multi-layer file format such as an Adobe PDF®, Microsoft XPS®, or other proprietary multi-layer format.

The resulting information can be used for automated document sorting, region of interest classification, targeting and other tasks requiring image feature differentiation.

Figure 1:
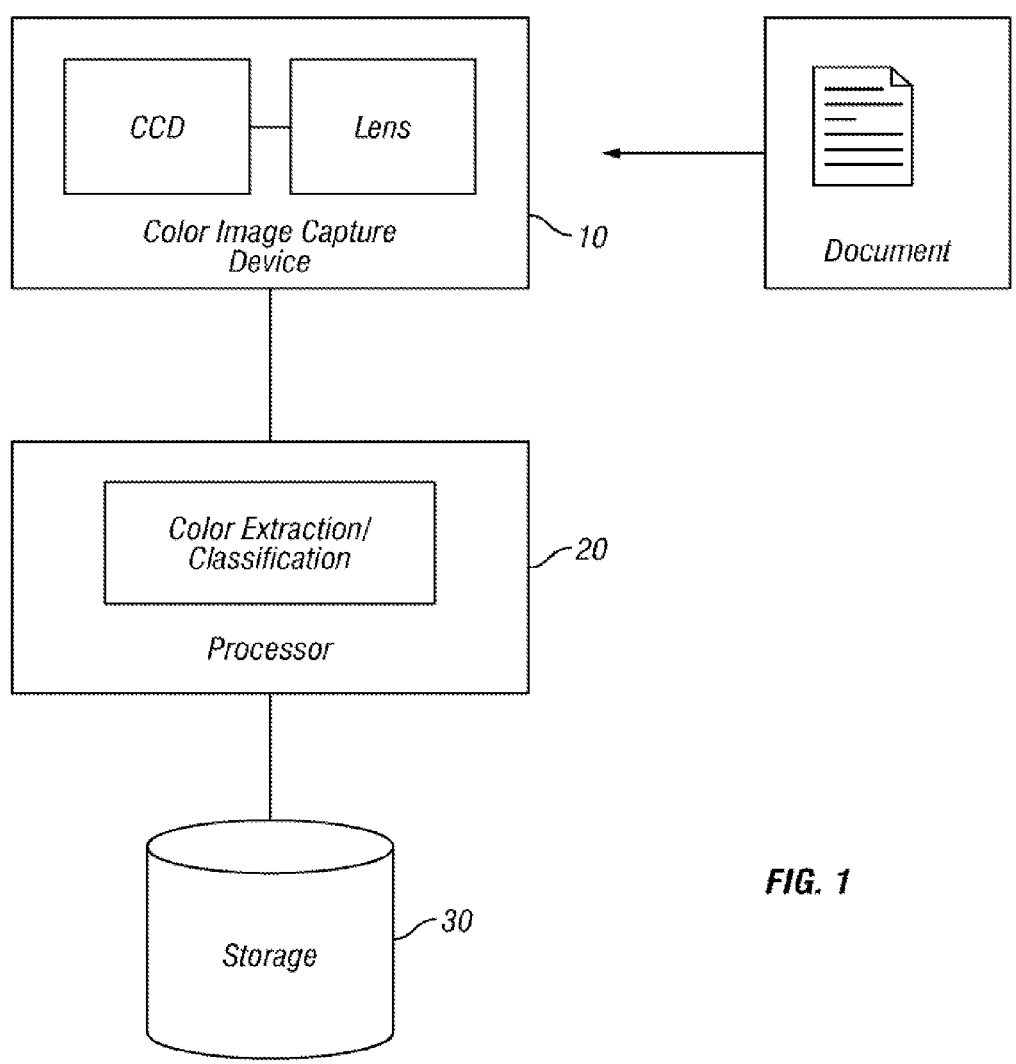
FIG. 1 is a schematic diagram of a system for identifying and classifying color regions in accordance with an embodiment of the present invention.

Referring to FIG. 1, the inventive method is preferably executed by software residing within a processor-equipped device 10. The processor-equipped device 10 is operatively connected to a color image capture device 20 such as a scanner. The processor-equipped device 10 is also operatively connected to a storage or memory device 30 for storing image files. Preferably, the file Turning now to FIG. 2, a preferred method of the present invention is illustrated. As an initial step 100, the present system evaluates "bit depth," e.g., the number of bits used to store information about each pixel of an image. The higher the depth, the more colors that are available for storage. The bit depth of an image will determine how many levels of gray (or color) can be generated. In the present system, the bit depth is assessed and if the depth corresponds to a black and white image or a gray scale image, then the color extraction process is terminated resulting in an output result of an empty set of color regions 210.

Figure 2:
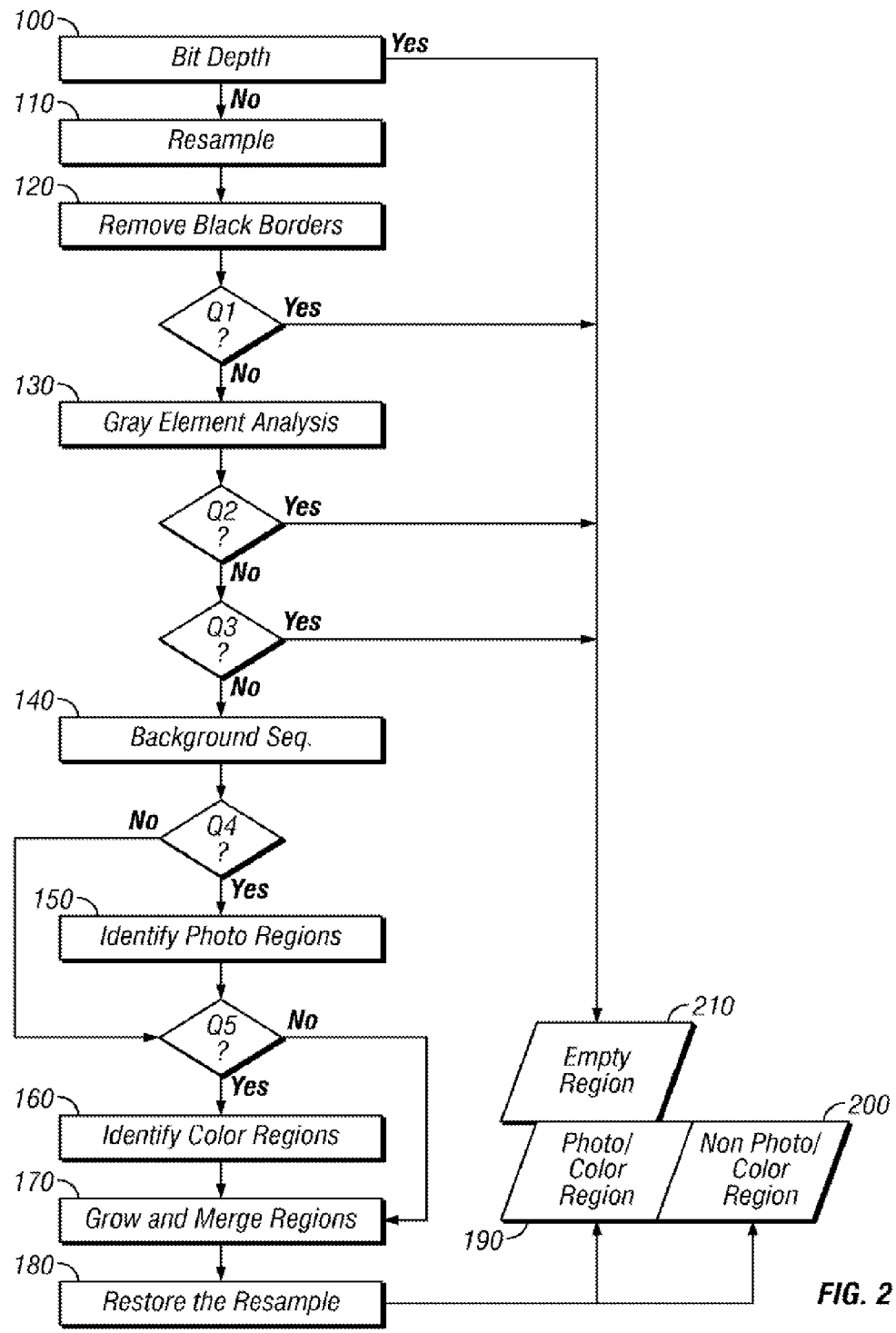
FIG. 2 is a flowchart of a method of identifying and classifying color regions in accordance with an embodiment of the present invention.
Figure 3:
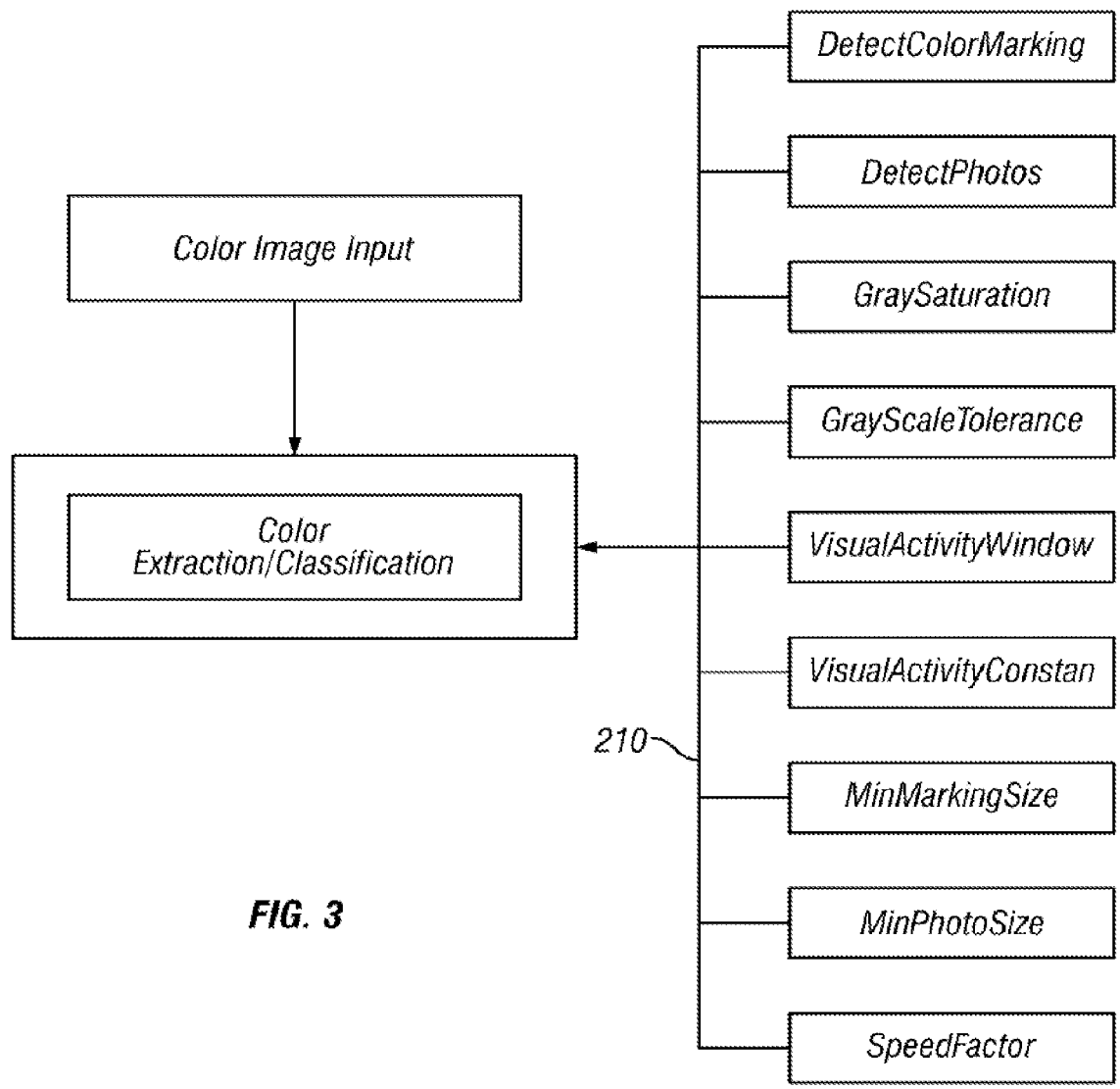
FIG. 3 is a simplified flowchart of input arguments according to the method of FIG. 2.

In FIG. 2, this decision process has been labeled with 'Yes' and 'No.' If the bit depth is that of a black and white or gray scale image, e.g., 'Yes,' then the output result is an empty color region 210. If the bit depth is not that of a black and white or gray scale image, e.g., 'No,' then the inventive process continues.

For example, black and white images may have a bit depth of 1. If the inventive system detects a bit depth of 1, the color extraction process will be terminated. If, however, a color bit depth is detected, say for example a depth of 8-bits or 24-bits, the next step in the color extraction process, resampling the image is initiated. As stated, a user can preferably select or modify the criteria used for the bit depth analysis as one of the input arguments.

In the resampling step, step 110, the image is resampled and rescaled down to a smaller size to expedite analysis of the document. Preferably, a user can select the extent to which an image is rescaled, e.g., by ½, ¼ or ⅛ of the original size. Once the image has been resized, black borders are detected and cropped at step 120.

In this process, the image is scanned to determine if it is a black border by examining the color vector of each pixel. In assessing black borders, a determination is made that if a pixel exceeds a predetermined value it is black, if not, it is considered 'noise.' When the total amount of noise has exceeded 1% of the dimension being scanned, it is then considered 'signal' and is considered a non-black border. As will be appreciated, the black borders are cropped and non-black border portions, i.e., those assessed as 'signal,' are retained. If all pixels in an image are black border elements, then the color extraction process is terminated with the output result of an empty set of color regions. This decision process is noted with Q1, which refers to the determination of whether the entire document is black. Upon detection and cropping of border elements, a gray element analysis instituted, as noted at step 130.

In the gray element analysis, a function ColorToGray(x, y, z) is used to map from an RGB color vector space to a gray scale vector space. A gray scale image is created from the input color image using ColorToGray function. This RGB color to gray transformation may be accomplished with known, conventional processes/algorithms. Once the transformation has taken place, for each pixel of a picture element of which value is represented by a RGB vector (x, y, z), the distance to gray scale space is evaluated between from (x, y, z) to (v, v, v) where v=ColorToGray(x, y, z). Preferably, a Malahanobis distance statistical methodology is employed. In this manner, a determination is made as to whether the original scanned document is gray scale by comparing the original to the gray scale transformation. A pixel is considered a gray element if the distance is less than a user specified threshold value. As noted at Q2, if a percentage of gray elements is greater than an internally specified threshold value, then an image is determined to be completely gray and contains no useful color information. The color extraction process is then terminated with the output result of an empty set of color regions. If, however, the picture element is not all gray, then a background segmentation process, step 140, is initiated.

In the background segmentation process, every element that is not text, pictures or images is deemed background including margin space and the like. Initially, the process involves the creation of a new memory space. This memory space has a size of w×h, where w=width of image and h=height of image. An HSL color transformation is then applied to the input color digital image. For each pixel of the input image, an H component, i.e., hue, of the HSL vector will be copied into the memory space just created. An unsupervised clustering method is then applied to the H component data to identify background colors if any such colors are present. If the set of background colors is not empty, then the regions of background are identified as follows.

First, an image slicing method is applied to the H component data to obtain a binary image in which a background color is represented by black pixels and all other colors present are white. Known slicing methodologies may be employed. Portions of the image that can be sliced are background, those that could not be sliced are non-background portions. After slicing, a set of connected components of black pixels, i.e., background color, on the binary image is identified. A size analysis method is then applied to the bounding boxes of the connected components to determine whether certain bounding boxes are to be merged together or discarded. Only merged bounding boxes are considered as a set of background regions. Each pixel in identified background regions is considered to be a gray element. If a percentage of occupancy of gray elements is greater than an internally specified threshold value, e.g., the document/image is entirely background such as, for example, a blank sheet of colored paper stock, then the color extraction process will be terminated resulting in an empty set of color regions.

The background segmentation step is an important aspect of the present invention as it effectively segments background from non-background elements such as images. In particular, the sub-steps of first applying HSL, then slicing and then merging bounding boxes is believed to be unknown in the art and provides an excellent method of identifying and segmenting background elements.

Once the background elements have been segmented, an optional photo identification step, step 150, is initiated. As will be appreciated, a user may opt to skip this step should the documents/images include no photographic elements. The selection process for step 150 is depicted at Q4. Photo identification is accomplished through the application of median filtration methods to the gray-scaled image created at step 130, i.e., the gray element analysis. Two different median filtering methods are applied. First, filtering is done with a large window size and then filtering with a short window size. A difference image between the two images is created from the two filtering methods and then converted to a binary image using an adaptive threshold method. A connected components method is then applied to the binary image to obtain a set of bounding boxes of black pixels. A size analysis method is then applied to the set of connected components in which bounding boxes having regions of small size are rejected as being non-photo regions. The photo region is the remaining set of bounding boxes of the connected components.

Once any photo regions have been identified or the photo identification step has been skipped, color regions are subsequently identified at step 160. As will be appreciated, a user may opt to skip this step as well and the selection process is noted at Q5. In step 160, the original color image is converted to a binary image. Those pixels marked as gray elements or in any photo regions are set as white pixels while the rest are set as black pixels. A connected components method is applied to obtain the bounding boxes of connected components of black pixels. The overlapped bounding boxes are merged into a single large bounding box. A size analysis method is then applied on the set of bounding boxes in which connected components having bounding box of smaller size than a user specified threshold value are rejected. Such smaller boxes could be those created by color noise, for example. The remaining set of bounding boxes of the connected components is regarded as the color region.

Identifying color regions is another important aspect of the present invention. Many documents contain black and white textual content as well as valuable color information. These documents are typically scanned as color resulting in a substantially larger file than an equivalent black and white version but retaining all color information. As will be appreciated, when documents contain just black and white or gray textual elements, the additional color information is not useful. In known systems that scan as color, a manual review process must be used to convert these digitized color images to black and white for storage, bandwidth and readability optimizations. The present invention provides a method and system in which the manual detection and separation of color elements is unnecessary.

The next step in the inventive process, step 170, is to grow and merge photo and color regions. Each box of photo regions obtained from the photo identification step is expanded up to an internally specified value to find overlapping photo regions. If any overlapping regions are found, they are merged into a single photo region. Likewise, each box of any color regions obtained from the color identification step is expanded up to an internally specified value to find any overlapping color regions. If overlapping color regions are found, they are merged into a single color region.

Finally, the image/document is restored and resized at step 180 using the rates of resizing applied at the resampling step 120. The scale is restored to the regions of color marks and photos. The color extraction process returns the resulting photo and color regions.

In this process, photo and color regions are separated from non-photo/color regions. This is graphically illustrated at boxes 190 and 200 in FIG. 2. The empty region discussed above is graphically depicted at reference number 210.

As mentioned above, there are several steps in the inventive method and system in which a user can enter input arguments. These input arguments 210 are graphically depicted in FIG. 3 and include a pointer to the image data; a triplet of integer values of width, height and row stride of the image; two Boolean options "DetectColorMarkings" and "DetectPhotos"; an integer value of saturation threshold; an integer value of threshold for distance to gray scale space; an integer value of valid interval for size of color regions; an integer value of valid interval for size of photo regions; and an integer value of the resizing rates.

The output from the inventive system is that photo regions and color regions are represented by sets of vectors for pixel coordinate in the input image.

Figure 4:
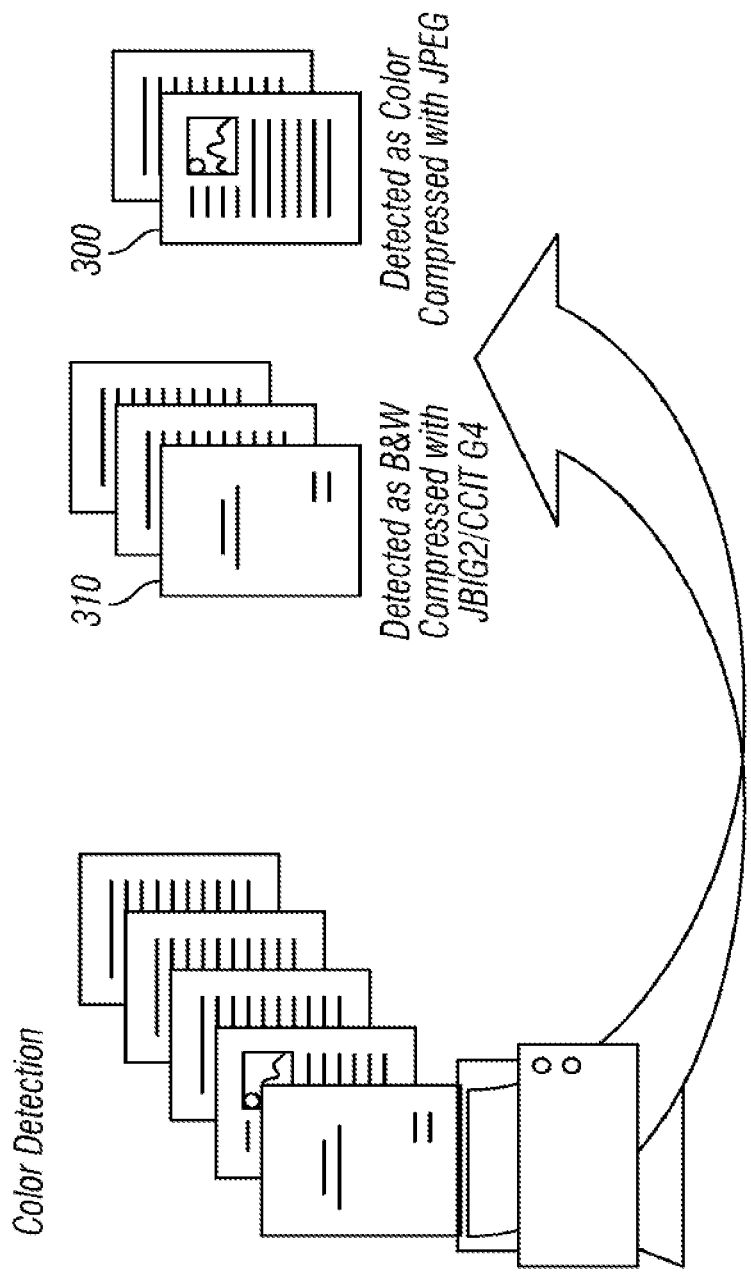
FIG. 4 is a graphical illustration of how the system and method of FIGS. 1 and 2 segments and detects and segments color from black and white for separate compression.
Figure 5:
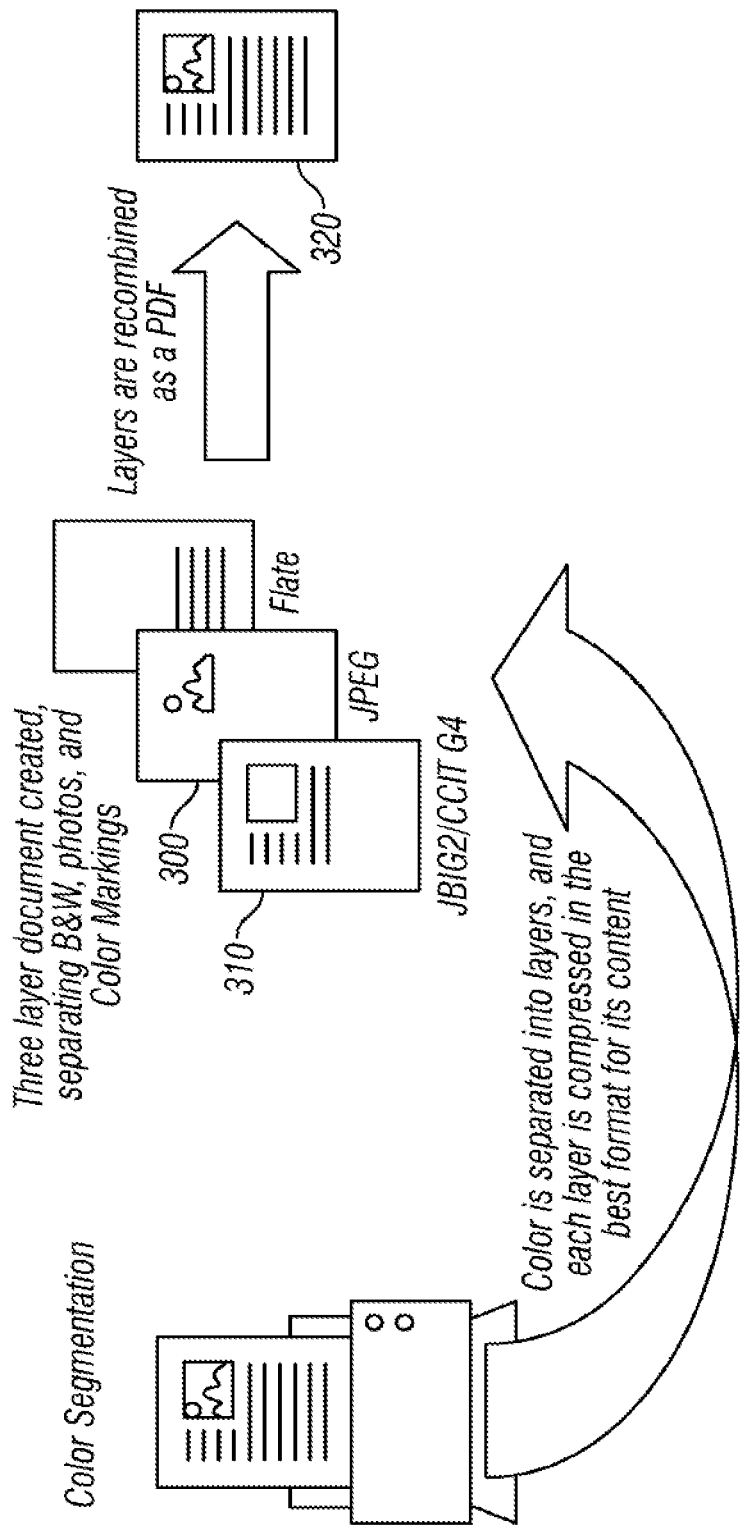
FIG. 5 is a graphical illustration of how the system and method of FIGS. 1 and 2 segments and combines multiple layers from a digitized image.

Referring now to FIGS. 4 and 5 the present invention provides a convenient method of detecting color and separating color from black and white text in documents scanned as color. This is significant in that it allows color images 300 and the like to be compressed differently from black and white text 310. For example, color images/photos may be compressed with JPEG, which is appropriate for such images. The JPEG files will be relatively large, however. Black and white text, however, should optimally not receive this same compression as the resulting file will be unnecessarily large and JPEG is a lossy compression and not well suited for text. As such, text may be compressed with JBIG2/CCIT G4, a bilevel format appropriate for text. In this way, both file size and image readability can be optimized.

Moreover, once the different elements of an image have been separated and individually compressed, they may be recombined. In particular, the multiple compressed layers such as JBIC2/CCIT G4, JPEG and Flate can be combined in a PDF file 320. As will be readily appreciated, this PDF file will have a substantially smaller size then if the initial document with both color and black and white text were saved as a PDF.

An additional important aspect of the present invention is that the application of many of the inventive steps functions as a filter reducing the amount of information to process in subsequent steps. For example, applying a median filter to an entire image with a large window is an expensive operation, but having already sliced the image, the amount of data to be filtered is reduced. Likewise, detecting background color first and only building and analyzing connected components from the detected color is potentially less expensive than doing that across an entire image.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all equivalent embodiments.

What is claimed is:

1. A system, comprising: a processor; and a program of instructions executable by the processor to perform a method of identifying and classifying regions of a digital image, said method comprising: inputting an image as a color digital image; obtaining information that identifies color and photo regions of said color digital image; classifying color, photo, non-color and non-photo regions of said color digital image based upon said identifying information; and individually compressing said color, non-color, photo and non-photo regions based on a quality characteristic of each of said regions, wherein said photo regions are classified by the following steps: transforming said color digital image to gray scale; applying a first median filtering method to said gray scale image creating a first filtered image; applying a second median filtering method to said gray scale image creating a second filtered image; creating a difference image from between said first and second filtered images; converting said difference image to a binary image; obtaining a set of bounding boxes of black pixels in said binary image through a connected components method; and applying a size analysis to said connected components wherein connected components having a size below a predetermined threshold are marked as non-photo regions and remaining bounding boxes of said connected components are photo regions.

2. A system, comprising: a processor; and a program of instructions executable by the processor to perform a method of identifying and classifying regions of a digital image, said method comprising: inputting an image as a color digital image; obtaining information that identifies color and photo regions of said color digital image; classifying color, photo, non-color and non-photo regions of said color digital image based upon said identifying information; individually compressing said color, non-color, photo and non-photo regions based on a quality characteristic of each of said regions; assessing a bit-depth of said color digital image to determine whether said image is entirely black and white or entirely grayscale; and terminating said classification of said regions if said image has a bit-depth indicating that it is black and white or grayscale.

3. A system, comprising: a processor; and a program of instructions executable by the processor to perform a method of identifying and classifying regions of a digital image, said method comprising: inputting an image as a color digital image; obtaining information that identifies color and photo regions of said color digital image; classifying color, photo, non-color and non-photo regions of said color digital image based upon said identifying information; individually compressing said color, non-color, photo and non-photo regions based on a quality characteristic of each of said regions; resampling and resizing said image to expedite the identification and classification of said regions of said digital image.

4. The system of claim 3 wherein the program further includes instructions for restoring said image to its original size prior to said resampling.

5. A system, comprising: a processor; and a program of instructions executable by the processor to perform a method of identifying and classifying regions of a digital image, said method comprising: inputting an image as a color digital image; obtaining information that identifies color and photo regions of said color digital image; classifying color, photo, non-color and non-photo regions of said color digital image based upon said identifying information; individually compressing said color, non-color, photo and non-photo regions based on a quality characteristic of each of said regions; identifying black border regions in said image; removing any identified black border regions.

6. The system of claim 5 wherein said identification of black border elements includes the steps of: determining whether pixels that comprise said color digital image are black; scanning said black pixels along a dimension of said image to determine a boundary of said black border; establishing said boundary of said black border where said non-black pixels exceed one-percent of a total of said pixels of said scanned dimension.

7. A system, comprising: a processor; and a program of instructions executable by the processor to perform a method of identifying and classifying regions of a digital image, said method comprising: inputting an image as a color digital image; obtaining information that identifies color and photo regions of said color digital image; classifying color, photo, non-color and non-photo regions of said color digital image based upon said identifying information; individually compressing said color, non-color, photo and non-photo regions based on a quality characteristic of each of said regions; and identifying gray elements in said image; removing any identified gray elements.

8. The system of claim 7 wherein identifying gray elements includes: transforming said color digital image to gray scale to create a gray scale image; computing a Malahanobis distance for each color pixel in said color digital image to a corresponding pixel of said transformed gray scale image; and marking a pixel in said color digital image as gray if it exceeds a predetermined distance from its counterpart in said gray scale image.

9. The system of claim 7 wherein said identification of color elements includes the following: creating a binary image from said color digital image; marking any pixels previously identified as gray or photo elements as white and any remaining pixels as black; applying a connected components method to obtain bounding boxes of connected components of said black pixels; merging any overlapping bounding boxes into a single bounding box; applying a size analysis method to said bounding boxes in which connected components having a bounding box of a smaller size than a predetermined value are marked as non-color and a remaining set of bounding boxes of said connected components are marked as a color region.

10. A system, comprising: a processor; and a program of instructions executable by the processor to perform a method of identifying and classifying regions of a digital image, said method comprising: inputting an image as a color digital image; obtaining information that identifies color and photo regions of said color digital image; classifying color, photo, non-color and non-photo regions of said color digital image based upon said identifying information; individually compressing said color, non-color, photo and non-photo regions based on a quality characteristic of each of said regions; identifying background elements; removing said background elements.

11. The system of claim 10 wherein identifying background elements includes: creating a memory space having a width and height corresponding to that of said color digital image; applying an HSL color transformation to said color digital image; copying an H component from said HSL transformation for each pixel of said color digital image into said memory space; applying an unsupervised clustering method to said H component data to identify background colors if present; applying an image slicing method to said H component data to obtain a binary image in which background pixels are black; obtaining a set of bounding boxes of using a connected components methodology for said black pixels; and applying a size analysis to determine which bounding boxes are to be merged and considered background.

12. A system, comprising: a processor; and a program of instructions executable by the processor to perform a method of identifying and classifying regions of a digital image, said method comprising: inputting an image as a color digital image; obtaining information that identifies color and photo regions of said color digital image; classifying color, photo, non-color and non-photo regions of said color digital image based upon said identifying information; individually compressing said color, non-color, photo and non-photo regions based on a quality characteristic of each of said regions;

merging said photo and said color regions.

13. Electronically-readable, non-transitory media embodying a program of instructions executable by a processor to perform a method of digital image analysis, the method comprising: inputting an image as a color digital image; obtaining information that identifies color and photo regions of said color digital image; classifying color, photo, non-color and non-photo regions of said color digital image based upon said identifying information; and individually compressing said color, non-color, photo and non-photo regions based on a quality characteristic of each of said regions, wherein said photo regions are classified by the following steps: transforming said color digital image to gray scale; applying a first median filtering method to said gray scale image creating a first filtered image; applying a second median filtering method to said gray scale image creating a second filtered image; creating a difference image from between said first and second filtered images; converting said difference image to a binary image; obtaining a set of bounding boxes of black pixels in said binary image through a connected components method; and applying a size analysis to said connected components wherein connected components having a size below a predetermined threshold are marked as non-photo regions and remaining bounding boxes of said connected components are photo regions.

14. Electronically-readable, non-transitory media embodying a program of instructions executable by a processor to perform a method of digital image analysis, the method comprising: inputting an image as a color digital image; obtaining information that identifies color and photo regions of said color digital image; classifying color, photo, non-color and non-photo regions of said color digital image based upon said identifying information; individually compressing said color, non-color, photo and non-photo regions based on a quality characteristic of each of said regions; assessing a bit-depth of said color digital image to determine whether said image is entirely black and white or entirely grayscale; and terminating said classification of said regions if said image has a bit-depth indicating that it is black and white or grayscale.

15. Electronically-readable, non-transitory media embodying a program of instructions executable by a processor to perform a method of digital image analysis, the method comprising: inputting an image as a color digital image; obtaining information that identifies color and photo regions of said color digital image; classifying color, photo, non-color and non-photo regions of said color digital image based upon said identifying information; individually compressing said color, non-color, photo and non-photo regions based on a quality characteristic of each of said regions; resampling and resizing said image to expedite the identification and classification of said regions of said digital image.

16. Electronically-readable, non-transitory media embodying a program of instructions executable by a processor to perform a method of digital image analysis, the method comprising: inputting an image as a color digital image; obtaining information that identifies color and photo regions of said color digital image; classifying color, photo, non-color and non-photo regions of said color digital image based upon said identifying information; individually compressing said color, non-color, photo and non-photo regions based on a quality characteristic of each of said regions; identifying black border regions in said image; removing any identified black border regions.

17. Electronically-readable, non-transitory media embodying a program of instructions executable by a processor to perform a method of digital image analysis, the method comprising: inputting an image as a color digital image; obtaining information that identifies color and photo regions of said color digital image; classifying color, photo, non-color and non-photo regions of said color digital image based upon said identifying information; individually compressing said color, non-color, photo and non-photo regions based on a quality characteristic of each of said regions; and identifying gray elements in said image; removing any identified gray elements.

18. Electronically-readable, non-transitory media embodying a program of instructions executable by a processor to perform a method of digital image analysis, the method comprising: inputting an image as a color digital image; obtaining information that identifies color and photo regions of said color digital image; classifying color, photo, non-color and non-photo regions of said color digital image based upon said identifying information; individually compressing said color, non-color, photo and non-photo regions based on a quality characteristic of each of said regions; identifying background elements; removing said background elements.

19. Electronically-readable, non-transitory media embodying a program of instructions executable by a processor to perform a method of digital image analysis, the method comprising: inputting an image as a color digital image; obtaining information that identifies color and photo regions of said color digital image; classifying color, photo, non-color and non-photo regions of said color digital image based upon said identifying information; individually compressing said color, non-color, photo and non-photo regions based on a quality characteristic of each of said regions;

merging said photo and said color regions.

* * * * *